(12) United States Patent
Muramatsu (10) Patent No.: US 8,110,997 B2
(45) Date of Patent: Feb. 7, 2012

(54) LED DRIVE CIRCUIT

(75) Inventor: Yasunori Muramatsu, Suita Osaka-Fu (JP)

(73) Assignee: Texas Instruments Incorporated, Dallas, TX (US)

( * ) Notice: Subject to any disclaimer, the term of this patent is extended or adjusted under 35 U.S.C. 154(b) by 518 days.

(21) Appl. No.: 12/323,149

(22) Filed: Nov. 25, 2008

(65) Prior Publication Data

US 2009/0174338 A1  Jul. 9, 2009

(30) Foreign Application Priority Data

Nov. 28, 2007  (JP) .................. 2007-307719

(51) Int. Cl.
*H05B 37/00* (2006.01)
*H05B 39/00* (2006.01)
*H05B 41/00* (2006.01)
*H05B 37/02* (2006.01)

(52) U.S. Cl. .................. 315/185 R; 315/192; 315/250; 315/307

(58) Field of Classification Search ... 315/185 R–185 S, 315/194, 291–307, 250; 363/47
See application file for complete search history.

(56) References Cited

U.S. PATENT DOCUMENTS

| 4,272,836 A | * | 6/1981 | Tamaru et al. | .................. 368/74 |
| 2009/0009105 A1 | * | 1/2009 | Sakurai | .......................... 315/291 |
| 2009/0195168 A1 | * | 8/2009 | Greenfeld | ..................... 315/192 |

* cited by examiner

*Primary Examiner* — Jacob Y Choi
*Assistant Examiner* — Henry Luong
(74) *Attorney, Agent, or Firm* — John J. Patti; Wade J. Brady, III; Frederick J. Telecky, Jr (57) ABSTRACT

A LED drive circuit equipped with oscillator 18, up/down counter 20, and DAC 22 in order to drive multiple LEDs 10(1)-10(m) in a block. Up/down counter 20 carries out count-up/down operations in sync with clock CLK sent from oscillator 18 during the ramping up/down of pulse-lighting of the LEDs. DAC 22 converts counter count value DN into analog voltage signal $V_{DAC}$ and supplies it to the gate terminal of NMOS transistor 14 via low-pass filter 28 and buffer amplifier 24.

21 Claims, 12 Drawing Sheets

LED DRIVE CIRCUIT

CROSS-REFERENCE TO RELATED APPLICATIONS

This application claims priority to Japanese Patent Appl. No. 2007-307719, filed on Nov. 28, 2007.

TECHNICAL FIELD

The present invention pertains to a light emitting diode (LED) drive circuit for lighting LEDs, and, in circuiticular, to an LED drive circuit for pulse-lighting of LEDs.

BACKGROUND

DC-lighting and pulse-lighting are available as methods for lighting LEDs. For example, pulse-lighting is utilized as an LED-based backlight of a liquid crystal display. In general, in the case of an LED-based backlight, the LEDs are pulse-lighted by means of pulse width modulation (PWM) at a specific frequency (for example, 10 KHz), and the brightness is adjusted by means of the ratio (duty ratio) between on-time and off-time within each cycle. In this case, during each cycle, an LED drive circuit is used to carry out switching operations such that many LEDs arranged two-dimensionally are turned on (lighted) at the same time at the beginning of the pulse-lighting, and then they are all turned off (turned off).

There is a problem that a high-frequency LED drive current that flows when the PWM-based switching operation is carried out to turn on/off the many LEDs at the same time becomes a source of electromagnetic interference or EMI. A standard EMI value is set at a defined value that must be satisfied in a final product, that is, it must be lower than the standard value. Since EMI as electromagnetic waves emitted from an applicable product affects the product itself and its surroundings (it may appear in the form of false operation of a system circuit inside a product, a screen disturbance, or radio noise), a component such as a shield or a filter is added to the source as a measure to reduce the emission of electromagnetic waves when a measured value exceeds the standard value. However, the conventional measure is disadvantageous in that it incurs high component and development costs.

SUMMARY

The present invention was devised in light of the problem of conventional technology, and its general objective is to present a low-cost LED drive circuit that is equipped with an effective EMI-prevention function while allowing LED pulse-lighting characteristics to be controlled as desired.

This and other objects and features are provided by a LED drive circuit in accordance with an aspect of the present invention is an LED drive circuit that injects a pulse-shaped LED drive current to LEDs (light-emitting diodes) in order to achieve pulse-lighting of the LEDs, wherein it has an oscillator that generates a clock with a desired frequency, an up/down counter that receives the clock input from the oscillator and carries out a count-up operation according to the clock when the LED drive current is ramped down, or a count-down operation according to the clock when the LED drive current is ramped up, a digital-to-analog converter (DAC) that converts a digital count value that is output from the up/down counter into an analog signal, and a transistor that is connected to a DC power supply in parallel with the LEDs and is operated according to an output signal from the DAC.

In addition, the LED drive circuit in accordance with an aspect of the present invention is an LED drive circuit that injects a pulse-shaped LED drive current to LEDs (light-emitting diodes) via a transistor, which is connected to a DC power supply in parallel with the LEDs, in order to achieve pulse-lighting of the LEDs, wherein it has an oscillator that generates a clock with a desired frequency, an up/down counter that receives the clock input from the oscillator and carries out a count-up operation according to the clock when the LED drive current is ramped down, or a count-down operation according to the clock when the LED drive current is ramped up, and a DAC that converts a digital count value that is output from the up/down counter into an analog signal, whereby the transistor is controlled based on an output signal from the DAC.

In the case of the LED drive circuit of an aspect of the present invention, the through rate at the time of ramping up/down of the LED drive current is controlled by the ramping up/down of the output signal from the DAC. In other words, it can be adjusted based on the frequency of the clock output from the oscillator and the resolution of the DAC. Therefore, when a risk of EMI is suspected, the EMI can be prevented easily and effectively by appropriately reducing the through rate at the time of the ramping up/down of the LED drive current.

In an embodiment of the present invention, the through rate adjustment circuit has a means to variably adjust the oscillating frequency of the oscillator and a frequency divider that divides the clock generated by the oscillator using a desired frequency dividing ratio or a means to variably adjust the resolution of the DAC.

In addition, when a rate circuit is provided that takes the clock input from the oscillator and allows the clock to be sent to the DAC only during a desired gating time, dynamic variable control over the through rate can be achieved.

In an embodiment of the present invention, the up/down counter may hold a preset maximum count value once the count value has reached the maximum value until the next count-down operation begins, or may hold a preset minimum count value once the count value has reached the minimum value until the next count-up operation begins. In a typical case, the LEDs at a constant cycle by means of a pulse width modulation (PWM) method in order to change the time between the beginning of the count-up operation and the end of the count-down operation of the up/down counter.

In an embodiment of the present invention, a buffer amplifier is connected between the output terminal of the DAC and the control terminal of the transistor. In this case, it is desirable that a resistor be connected to the DC power supply in series with the LEDs in order to generate a monitor voltage proportional to the LED drive current. Then, the buffer amplifier receives the monitor voltage input in the form of a feedback signal and outputs a control signal to the transistor such that the monitor voltage becomes equal to the voltage of an output signal from the DAC. More specifically, in a preferred configuration, the buffer amplifier is configured with an operational amplifier that is connected to the output terminal of the DAC through its non-inverting input terminal, to the resistor through its inverting input terminal, and to the control terminal of the transistor through its output terminal. When this kind of closed loop is adopted, it is even more desirable that a first switch be connected between the output terminal and the inverting input terminal of the operational amplifier, and that a first switch control circuit be used to hold the first switch in the off state while the LED drive current is being applied and to switch the first switch from the off state to the on state when the ramping down of the LED drive current is completed. Preferably, the first switch control circuit has a first decoder that interprets a digital count value output from the up/down counter in order to switch the state of the first switch according to the count value.

In an embodiment of the present invention, a second switch is connected between the output terminal of the DAC and the control terminal of the transistor, and a third switch is connected between the output terminal of a peak value control signal generator circuit and an output-side node of the second switch. Here, the peak value control signal generator circuit outputs a peak value control signal in order to bring the peak value of the LED drive current to a desired value. Then, the second switch control circuit has a second decoder that interprets a digital count value output from the up/down counter, whereby it holds the second switch in the on state while holding the third switch in the off state when the count value of the counter is lower than a preset value, or holds the second switch in the off state while holding the third switch in the on state when the count value is higher than the preset value. The peak value of the LED drive current can be controlled arbitrarily using such configuration.

In addition, in an embodiment, a low-pass filter is provided in order to smoothen the voltage waveform of an output signal from the DAC.

In addition, the drive circuit of the present invention is a drive circuit that supplies a pulse-shaped drive voltage to the control terminal of a transistor that is connected in series with an LED current path so as to control the supply of the LED drive current, wherein the drive circuit has a signal generator circuit that generates a voltage signal that changes from a first voltage value to a second voltage value, or from the second voltage value to the first voltage value in response to a control signal that instructs the driving of the transistor, and a signal supply circuit that supplies the drive voltage to the control terminal of the transistor based on the voltage signal.

In the case of the drive circuit, the ramping up/down of the pulse-shaped drive current supplied to the LEDs is controlled based on the rate of the voltage signal supplied to the control terminal of the transistor that changes in a staircase pattern.

In an embodiment, the signal supply circuit includes a counter that outputs a count value that increases gradually in response to a clock signal, or a count value that decreases gradually in response to the clock signal, and a voltage generator that generates a voltage signal corresponding to the count value; and the signal supply circuit includes a buffer amplifier that supplies the drive voltage to the control terminal of the transistor upon receiving the voltage signal and a feedback voltage from the LED current path. In this case, the signal supply circuit further includes a switch element that is connected between the non-inverting input terminal and the output terminal of the buffer amplifier, wherein the switch element is brought into the conductive state when the transistor is in the non-conductive state. It is even more desirable to further provide a low-pass filter between the signal generator circuit and the signal supply circuit.

DETAILED DESCRIPTION OF THE INVENTION

According to the LED drive circuit of the present invention, LED pulse-lighting characteristics can be controlled as desired due to the configuration and function, and EMI can be typically prevented effectively at a low cost. An embodiment of the present invention will be explained below with reference to attached figures.

Figure 1:
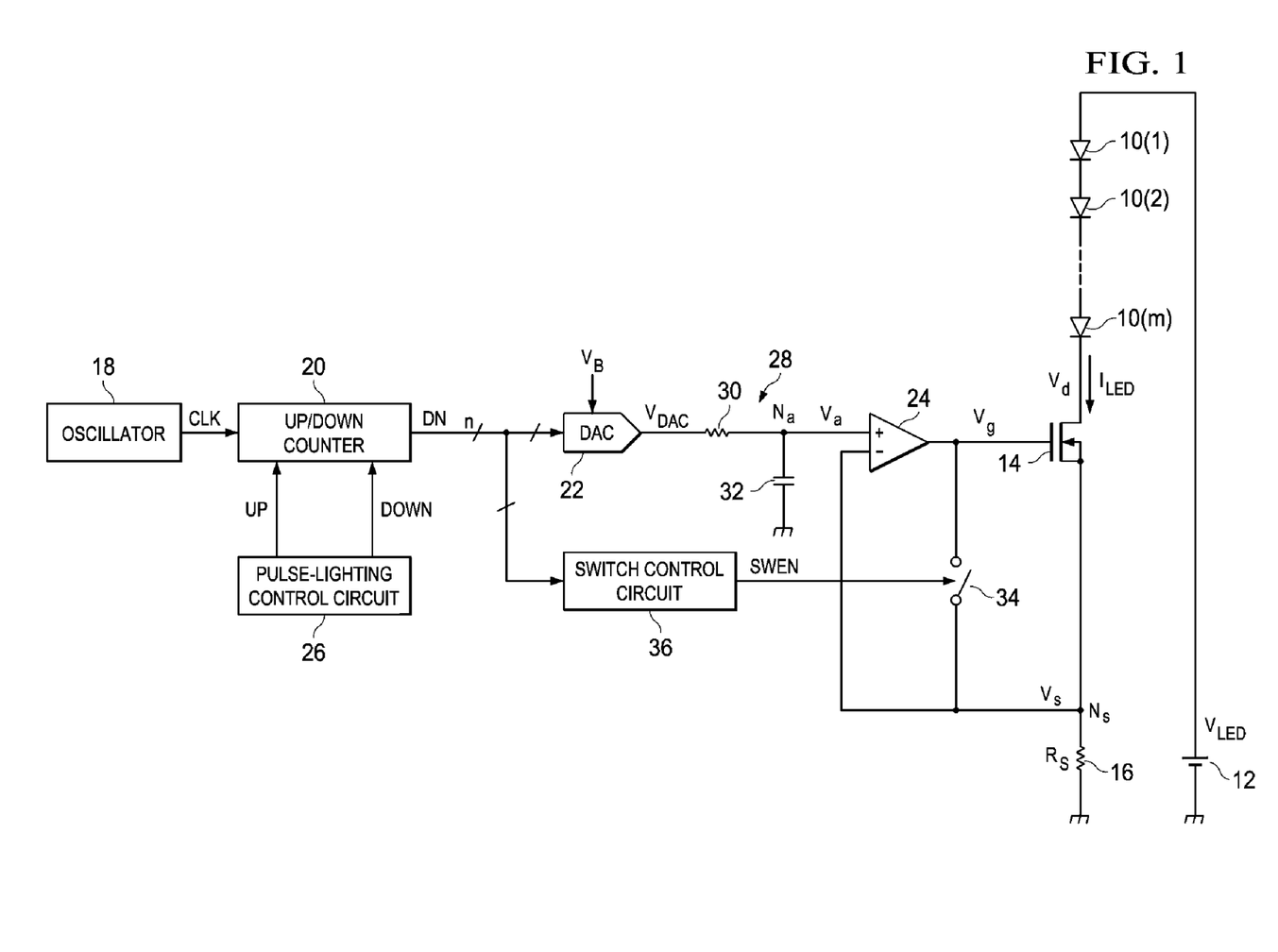
FIG. 1 is a block diagram showing the configuration of an LED drive circuit in accordance with an embodiment of the present invention.

The configuration of an LED drive circuit of an embodiment of the present invention is shown in FIG. 1. This LED drive circuit is used to drive many LEDs that are arranged in a matrix for LED backlighting, for example, by means of a pulse-lighting method. The illustrated circuit configuration is used to control the lighting of m units of LEDs $10(1)$, $10(2)$, . . . , and $10(m)$, that are provided in a row, in a block. The m units of LEDs $10(1)$-$10(m)$ are connected to DC power supply 12 that outputs specific drive voltage $V_{LED}$, in series in the forward direction, and NMOS transistor 14 and resistor 16 are connected in series in the order between the cathode terminal and the ground terminal of last-stage LED $10(m)$. This LED drive circuit is mostly characterized by a configuration that involves oscillator 18, up/down counter 20, and DAC (digital-analog decoder) 22.

Oscillator 18 is configured using a crystal-oscillator circuit, for example, and outputs clock CLK that oscillates at a desired frequency (for example, several MHz). Up/down counter 20 is configured using an n-bit synchronous counter, for example, whereby it receives clock CLK input from oscillator 18 in order to carry out a counting operation reversibly under the control of pulse-lighting control circuit 26. More specifically, it carries out a count-up operation in sync with clock CLK when a mode control signal (Up/Down) from pulse-lighting control circuit 26 indicates Up=H and Down=L, ends the count-up operation when count value DN reaches maximum value ($2^n-1$), and holds maximum count value DN ($2^n-1$) thereafter. In addition, it carries out a count-down operation in sync with clock CLK when Up=L and Down=H, ends the count-down operation when count value DN reaches the minimum value (0), and holds minimum count value DN (0) thereafter. Here, when Up=L and Down=L, up/down counter 20 stops the counting operation forcibly and comes to a rest.

DAC 22 takes the form of an n-bit ladder, for example, whereby it receives n-bit count values DN output from up/down counter 20 successively in the form of digital signals, applies D/A conversion to the respective input count values, and outputs analog voltage signals $V_{DAC}$. Reference voltage $V_B$ for the D/A conversion is supplied to DAC 22 by a reference voltage generator circuit not shown.

Output terminal of DAC 22 is connected to the gate terminal of NMOS transistor 14 via low-pass filter 28 and buffer amplifier 24. Low-pass filter 28 comprises resistor 30 and condenser 32, whereby a smoothening circuit is configured in order to smoothen the voltage waveform of output signal $V_{DAC}$ from DAC 22. Buffer amplifier 24 is configured using an operational amplifier, wherein its non-inverting input terminal (+) is connected to the output terminal (node Na) of low-pass filter 28, its inverting input terminal (-) is connected to node Ns that is located between the source terminal of MOS transistor 14 and resistor 16, and its output terminal is connected to the gate terminal of NMOS transistor 14.

Switch 34 is connected between the output terminal and the inverting input terminal (-) of operational amplifier 24. The switch 34 is configured using an NMOS transistor, for example, and it is held at either the on state or off state according to switch control signal SWEN from switch control circuit 36. Switch control circuit 36 is equipped with a decoder that interprets n-bit count value DN output from up/down counter 20, whereby it sets SWEN to H level so as to hold switch 34 in the on state when count value DN indicates the minimum value (0), or it sets SWEN to L level so as to hold switch 34 in the off state when count value DN indicates a value (1 or greater) other than the minimum value.

Pulse-lighting control circuit 26 controls the timing for starting and ending the pulse-lighting of the LEDs using the mode control signal (Up/Down) supplied to up/down counter 20. When a PWM method is to be used for controlling the pulse-lighting timing, it operates in response to a click with a prescribed frequency (for example, 10 kHz).

Now, basic operations of the LED drive circuit of the present embodiment will be explained based on the timing charts shown in FIG. 2 and FIG. 3. In this example, both up/down counter 20 and DAC 22 are of a 4-bit type. Values A, B, ..., and F as count values DN of the counter shown in FIG. 3 are expressed as hexadecimal numbers; and they correspond to decimal numbers 10, 11, ..., and 15, respectively.

Figure 2:
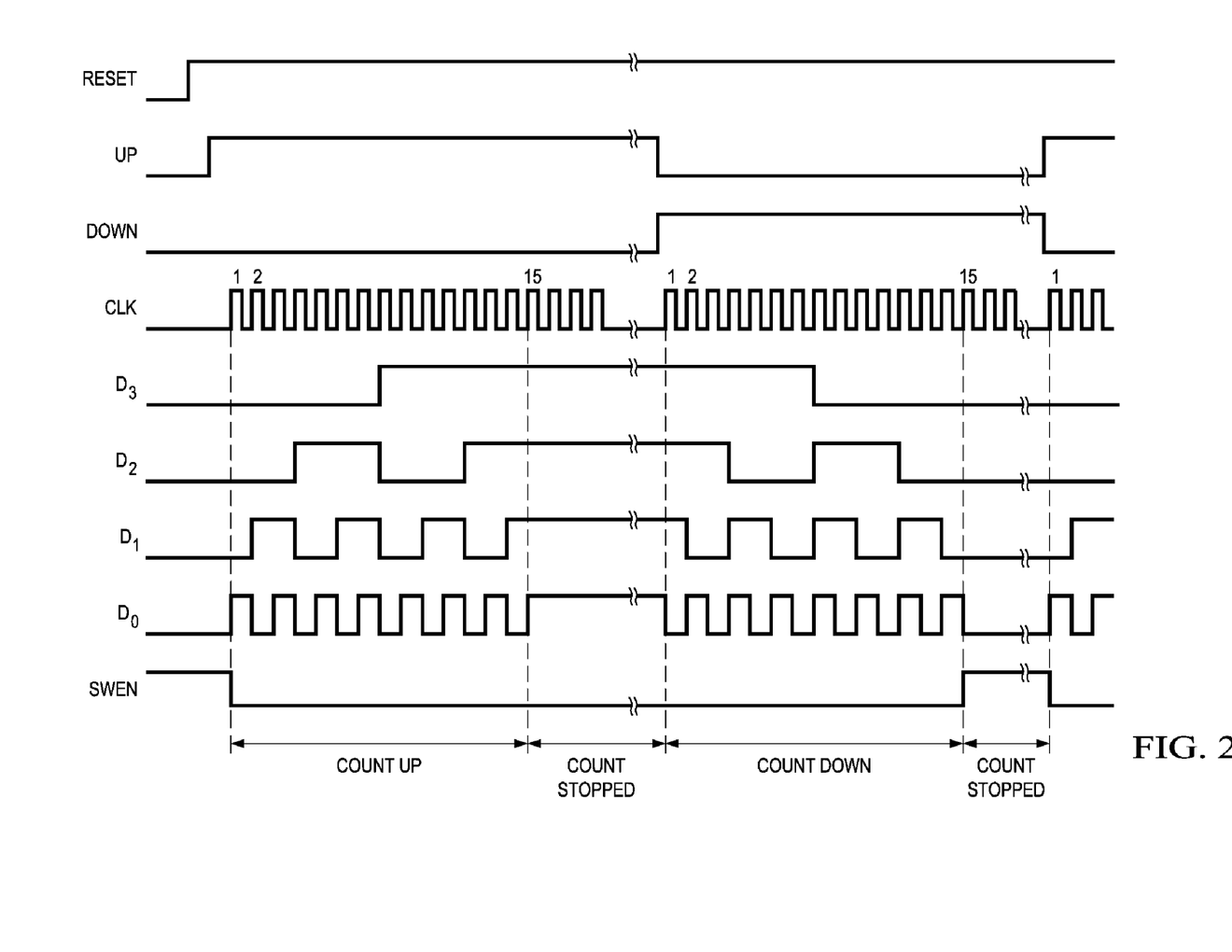
FIG. 2 is a timing chart showing the operation of an up/down counter provided in the LED drive circuit of FIG. 1.

In FIG. 2, as reset signal RESET changes from L level to H level, up/down counter 20 becomes enabled. Then, when pulse-lighting control circuit 26 switches the mode control signal (Up/Down) from Up=L and Down=L to Up=H and Down=L in order to initiate the pulse-lighting of the LEDs, up/down counter 20 starts the count-up operation and increments 4-bit count values DN ($D_3$, $D_2$, $D_1$, and $D_0$) by 1 every time clock CLK is input from oscillator 18.

In addition, when count value DN changes from the minimum or the initial value (0) to (1), switch control circuit 36 changes switch control signal SWEN from then H level to L level. As a result, in FIG. 1, switch 34 enters the off state, and voltage (monitor voltage) $V_S$ obtained at node Ns located between the source terminal of MOS transistor 14 and resistor 16 is input as a feedback signal. The monitor voltage $V_S$ is proportional to the current value of LED drive current $I_{LED}$ to be injected to the row of LEDs 10(1)-10(m), and it is expressed as $V_S=R_S \cdot I_{LED}$, when the resistance value of resistor 16 is denoted as $R_S$.

Figure 3:
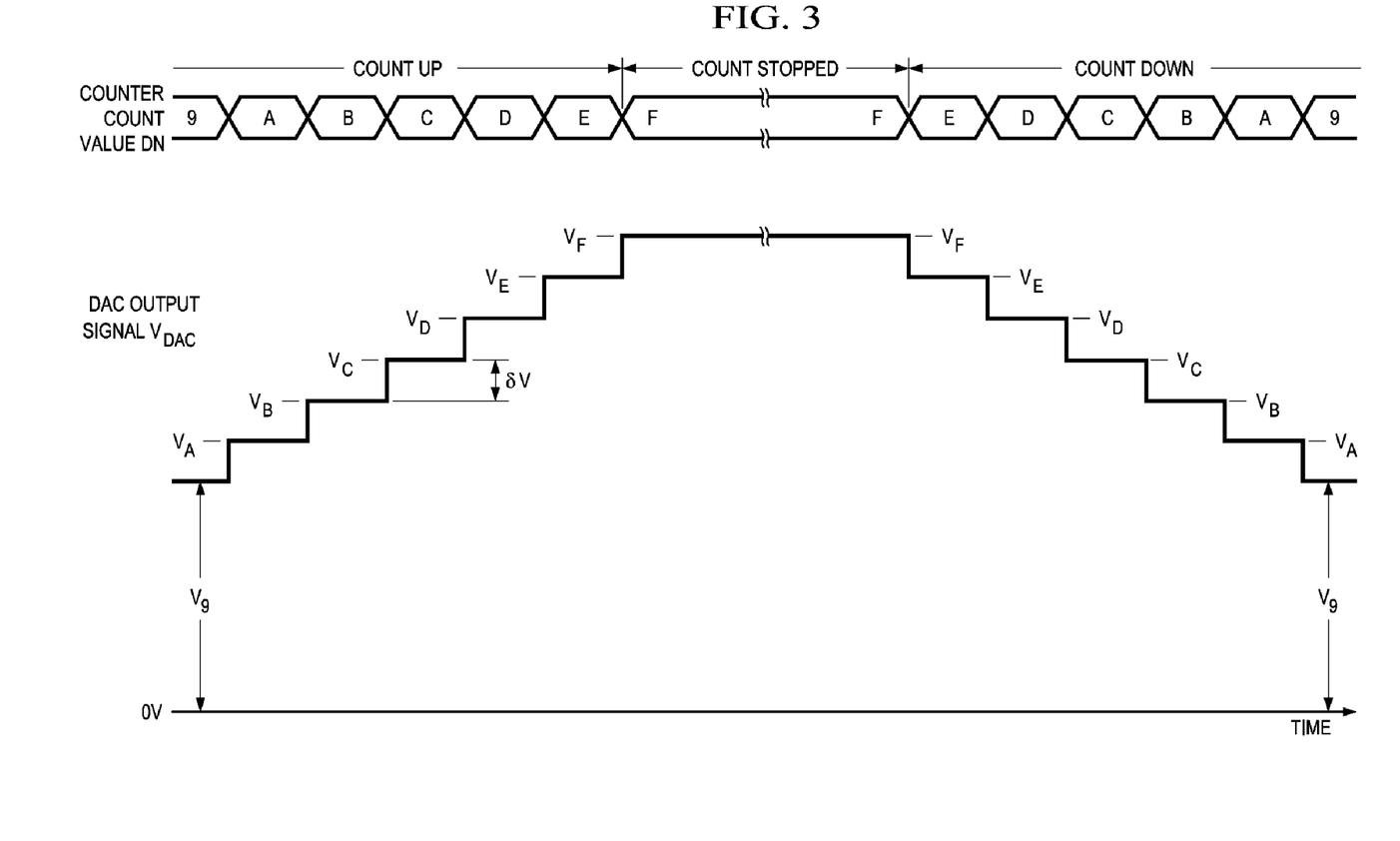
FIG. 3 is a signal waveform diagram showing the operation of a DAC provided in the LED drive circuit of FIG. 1.

As shown in FIG. 2 and FIG. 3, as counter count value DN increases in the manner expressed as ..., 9, A, B, ... as a result of a count-up operation of up/down counter 20, output signal $V_{DAC}$ from DAC 22 also increases in steps in a manner expressed as ..., $V_9$, $V_A$, $V_B$, .... In FIG. 1, DAC output signal $V_{DAC}$ is applied to the gate terminal of NMOS transistor 14 as gate control signal $V_g$ via buffer amplifier 24 after the voltage waveform is smoothened by low-pass filter 28. Then, NMOS transistor 14 gains conductance when the voltage of the gate control signal $V_g$ exceeds a threshold voltage, whereby LED drive current $I_{LED}$ begins to flow so as to light up LEDS 10(1)-10(m). Buffer amplifier 24 increases the voltage of output signal (gate control signal) $V_g$ by means of a closed loop operation in order for monitor voltage $V_S$, which is fed back from node $N_S$ to the inverting input terminal (-), to catch up with the voltage of DAC output signal $V_{DAC}$ that is input to the non-inverting input terminal (+). Ramping up of the pulse-lighting of the LEDs (ramping up of LED drive current $I_{LED}$) is achieved based on the count-up operation by up/down counter 20 in the manner.

Then, as shown in FIG. 2 and FIG. 3, when counter count value DN reaches the maximum value (F), the voltage of DAC output signal $V_{DAC}$ also reaches the maximum value or peak value $V_F$, whereby the ramping up of the pulse-lighting of the LEDs is ended. Subsequently, up/down counter 20 enters a non-counting state while holding the maximum count value (F), and DAC 22 holds output signal $V_{DAC}$ at peak value $V_F$. As such, the voltage of gate control signal $V_g$ that is supplied from buffer amplifier 24 to NMOS transistor 14 is held at fixed value $V_F$, and LED drive current $I_{LED}$ is held at a fixed value (peak value).

Then, pulse-lighting control circuit 26 switches the mode control signal (Up/Down) from Up=H and Down=L to Up=L and Down=H in order to end the pulse-lighting of the LEDs. Then, as shown in FIG. 2 and FIG. 3, up/down counter 20 begins the count-down operation, decrements 4-bit count value DN ($D_3$, $D_2$, $D_1$, and $D_0$) by 1 to F, E, D, ... every time clock CLK from Oscillator 18 is on; and DAC 22 reduces the voltage of output signal $V_{DAC}$ in steps in a manner expressed as $V_F$, $V_E$, $V_D$ .... As the voltage of DAC output signal $V_{DAC}$ drops in the manner, the voltage of gate control signal $V_g$ supplied to NMOS transistor 14 drops, and the current value of LED drive current $I_{LED}$ drops. Buffer amplifier 24 reduces the voltage of output signal (gate control signal) $V_g$ by means of a closed loop operation in order for monitor voltage $V_S$ that is fed back from node $N_S$ to catch up with the ramping down of DAC output signal $V_{DAC}$. Ramping down of the pulse-lighting of the LEDs (ramping down of LED drive current $I_{LED}$) is achieved based on a count-down operation by up/down counter 20 in the manner.

Then, as shown in FIG. 2, when up/down counter 20 counts 15 clocks CLK through the count-down operation, counter count value DN reaches the minimum value (0), and the voltage of DAC output signal $V_{DAC}$ also reaches minimum value $V_0$ (for example, 0 volt). Gate voltage $V_g$ of NMOS transistor 14 falls below the threshold voltage at some point during the count-down operation or at a point near its end. As a result, NMOS transistor 14 is turned off, LED drive current $I_{LED}$ stops, and LEDs 10(1)-10(m) stop emitting light. Ramping down of the pulse-lighting of the LEDs is completed in the manner.

On the other hand, when counter count value DN reaches the minimum value (0), switch control circuit 36 switches switch control signal SWEN from the L level to the H level (FIG. 2). Then, in FIG. 1, switch 34 enters the on state, inverting input terminal (−) and the output terminal of buffer amplifier 24 are short-circuited, and buffer amplifier 24 begins to function as a voltage follower. As such, buffer amplifier 24 can hold NMOS transistor 14 in the off state stably and reliably.

Once the ramping down of the pulse-lighting has ended, up/down counter 20 enters the non-counting state while holding the minimum count value (0), and DAC 22 holds output signal $V_{DAC}$ at minimum value $V_0$. Then, when pulse-lighting control circuit 26 switches the mode control signal (Up/Down) from the Up=L and Down=H to Up=H and Down=L in order to initiate the next pulse-lighting of the LEDs, up/down counter 20 begins the count-up operation, and operations identical to those described above are repeated at the respective circuits.

As described above, because the LED drive circuit of the present embodiment is equipped with oscillator 18, up/down counter 20, and DAC 22, the ramping up/down speed or the through rate at the time of the pulse-lighting of the LEDs can be adjusted based on the frequency of clock CLK and the resolution (quantum number) of DAC 22, so the occurrence of electromagnetic noise can be prevented reliably and effectively by adjusting the through rate.

During the operations, the peak value (crest value) of LED drive current $I_{LED}$ is correlated with the maximum count value (F) of up/down counter 20, and gate control voltage $V_g$ with a range that fully covers all count values (0)-(F) is supplied to the gate terminal of NMOS transistor 14.

Figure 4:
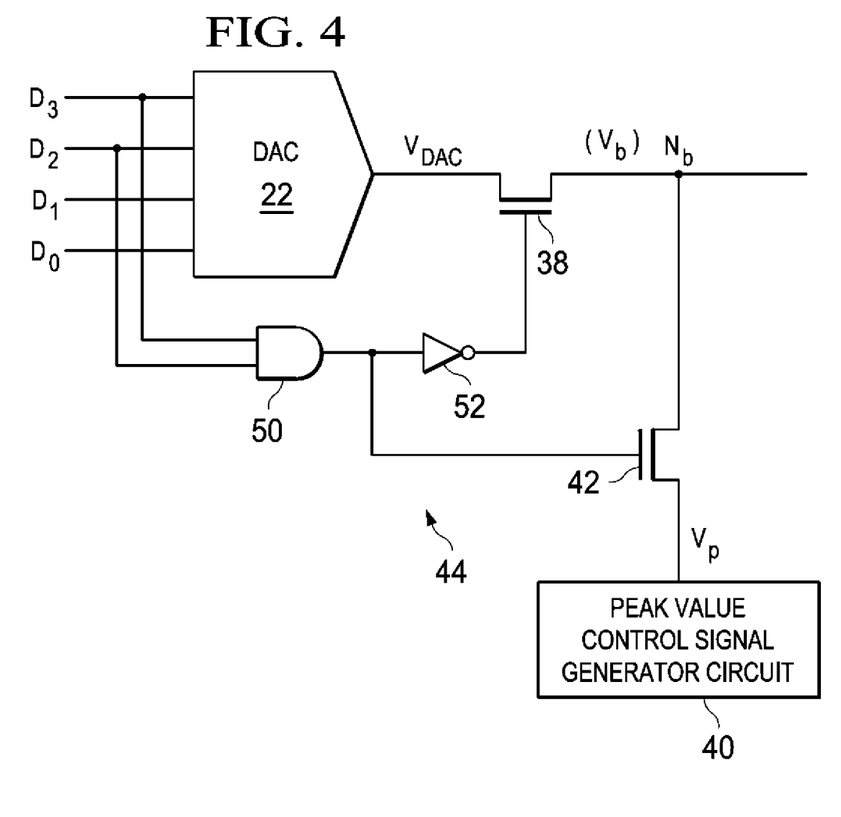
FIG. 4 is a diagram showing another configuration for the DAC of FIG. 1 to control the peak value of the LED drive current.

In a modification example, a circuit of the kind shown in FIG. 4 is added to the LED drive circuit of the present embodiment in order to allow the peak value of LED drive current $I_{LED}$ to correspond to any arbitrary value (C as a hexadecimal number in the example shown in the figure) out of all count values (0)-(F).

In FIG. 4, switch 38 is connected between the output terminal of DAC 22 and a latter-stage circuit (low-pass filter 28 in FIG. 1), and switch 42 is connected between the output terminal of peak value control signal generator circuit 40 and output-side node $N_b$ of switch 38. Here, peak value control signal generator circuit 40 generates peak value control signal $V_p$ to be applied to the gate terminal of NMOS transistor 14 in order to control the peak value of LED drive current $L_{LED}$ to become a desired value. Both switches 38 and 42 may be configured using NMOS transistors.

Switch control circuit 44, which is used to control the states of both switches 38 and 42, has a decoder comprising AND circuit 50 and NOT circuit 52 in order to decode count value DN from up/down counter 20 (FIG. 1), whereby it holds switch 38 in the on state while holding switch 42 in the off state when counter count value DN is (0)-(B), or holds switch 38 in the off state while holding switch 42 in the on state when counter count value DN is a value greater than (C).

More specifically, when counter count value DN is a value smaller than (C), the output of AND circuit 50 takes logical value L, whereby switch 42 enters the off state, and switch 38 enters the on state via NOT circuit 52. In addition, the output of AND circuit 50 takes logical value H when counter count value DN is a value greater than (C), whereby switch 42 enters the on state, and switch 38 enters the off state via NOT circuit 52.

Figure 5:
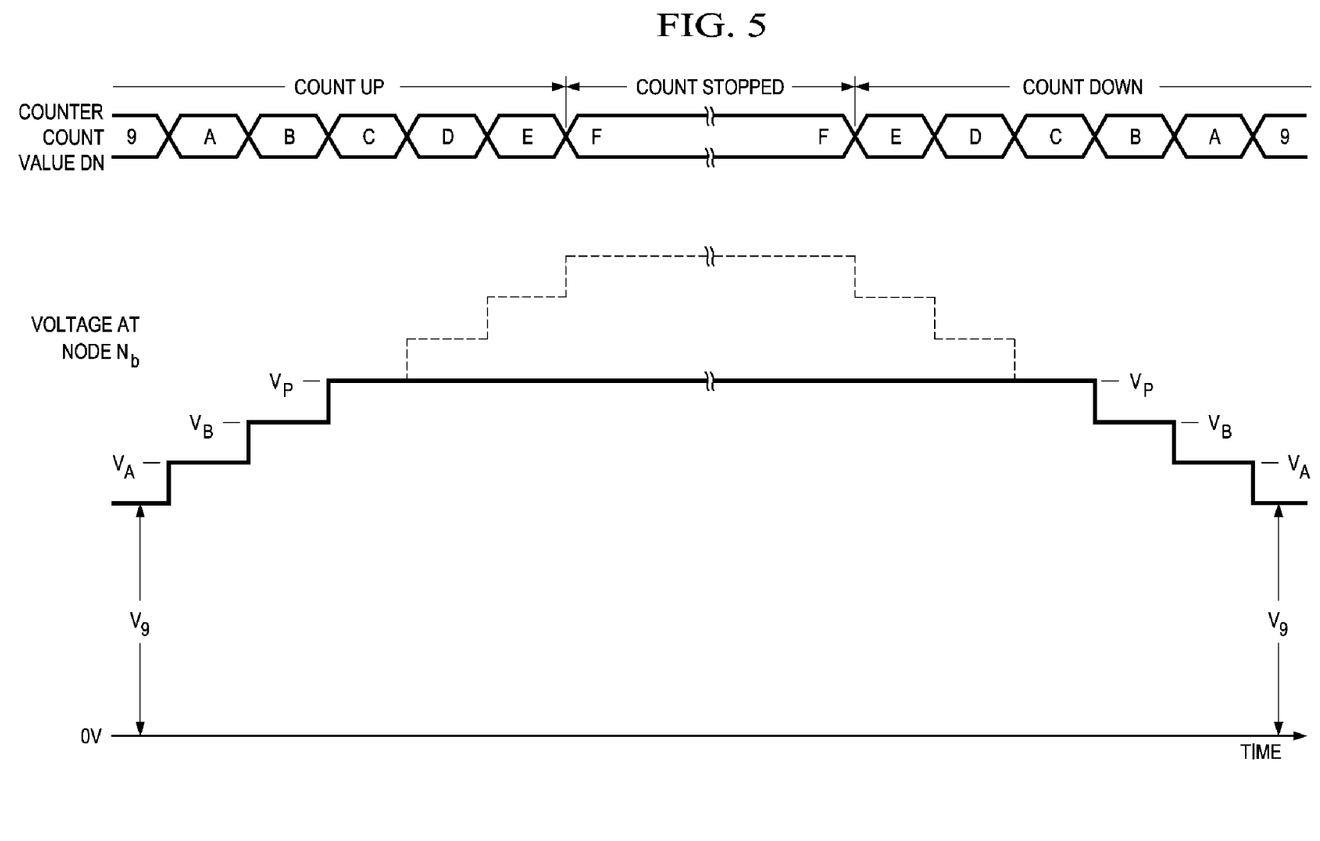
FIG. 5 is a signal waveform diagram showing the operation achieved when the circuit in FIG. 4 is employed.

The relationship between counter count value DN and the waveform of the signal obtained at node $N_b$ when the circuit in FIG. 4 is added to the LED drive circuit of the present embodiment is shown in FIG. 5. While counter count value DN is increasing from 1, 2, . . . , to (B) during the ramping up for the pulse-lighting, switch 38 is in the on state, and switch 42 is in the off state. Thus, DAC output signal $V_{DAC}$ ($V_1$, $V_2$, . . . , and $V_B$) is extracted at node $N_b$ via on-state switch 38. Then, when counter count value DN becomes (C) or greater, because switch 38 is in the off state, and switch 42 is in the on state, peak value control signal $V_p$ is extracted at node $N_b$ from peak value control signal generator circuit 40 via on-state switch 42. As described above, the ramping up for the pulse-lighting is completed when counter count value DN has reached (C), and peak value control signal $V_p$ is subsequently applied instead of DAC output signal $V_{DAC}$ to the gate terminal of NMOS transistor 14 via low-pass filter 28 and buffer amplifier 24. Here, the voltage of peak value control signal $V_p$ may be the same as or different from voltage $V_C$ of DAC output signal $V_{DAC}$ at the time counter count value DN is (C).

Furthermore, in FIG. 4, the decoder of switch control circuit 44 may be configured to be programmable so as to allow the voltage of peak value control signal VP to be variable. Due to the function that allows the peak value of LED drive current $I_{LED}$ to be adjusted or become variable, the LED brightness can be adjusted independently of the PWM control, for example.

Figure 6:
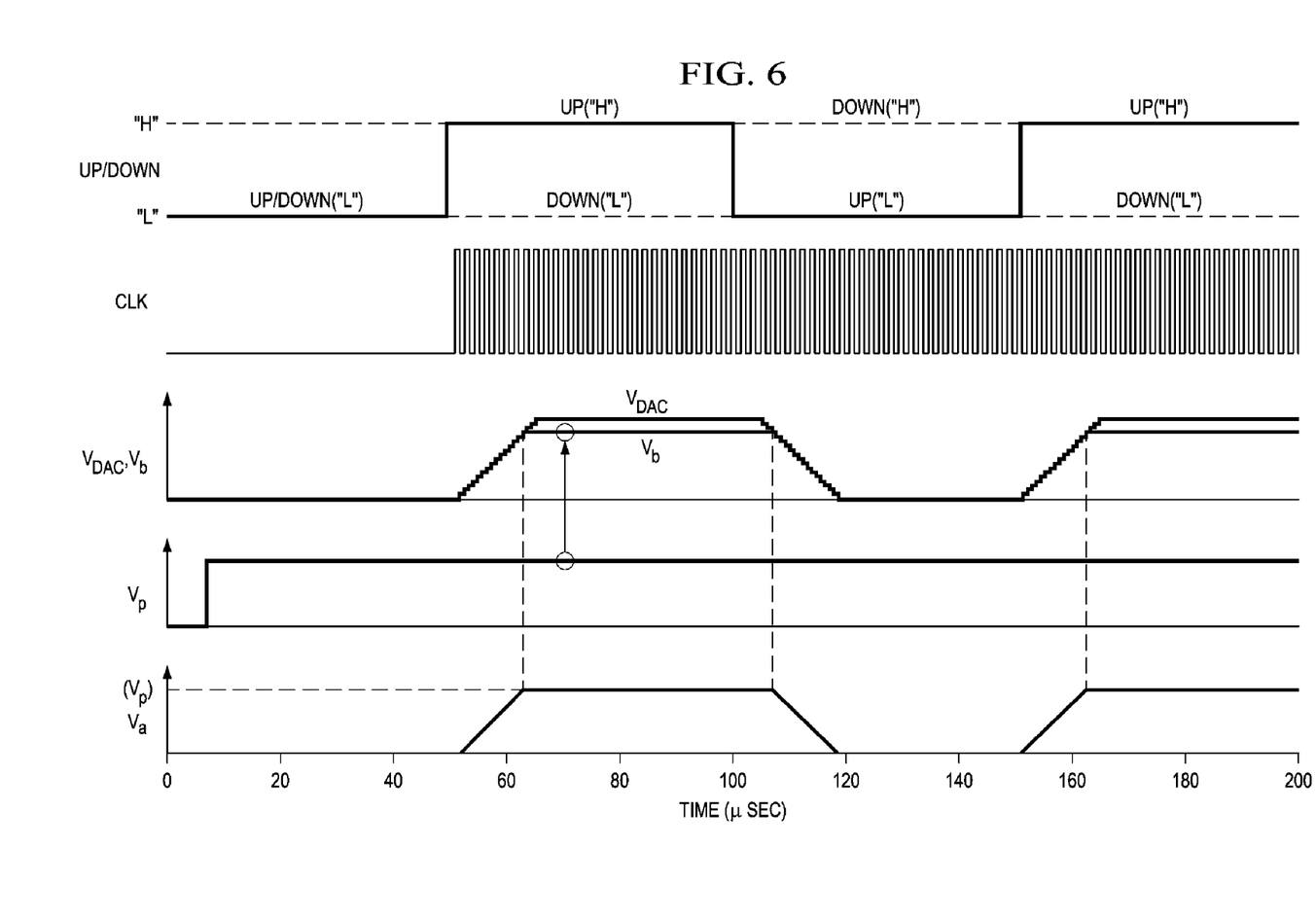
FIG. 6 is a signal waveform diagram showing an example of simulation results obtained when the circuit in FIG. 4 is employed.

An example of results of a specific simulation in the embodiment shown in FIG. 4 and FIG. 5 is shown in FIG. 6. In the figure, $V_b$ is the voltage of the signal obtained at output-side node $N_b$ of switch 38, and $V_a$ is the voltage of the signal obtained at output terminal $N_a$ of low-pass filter 28. In this simulation, the operating voltage of buffer amplifier 24 is 6 V, the operating voltage of the other circuits is 3.3 V, output voltage VLED of DC power supply 12 is 20 V, the frequency of clock CLK is 1 MHz, and the voltage of peak value control signal $V_p$ is 625 mV.

Figure 7:
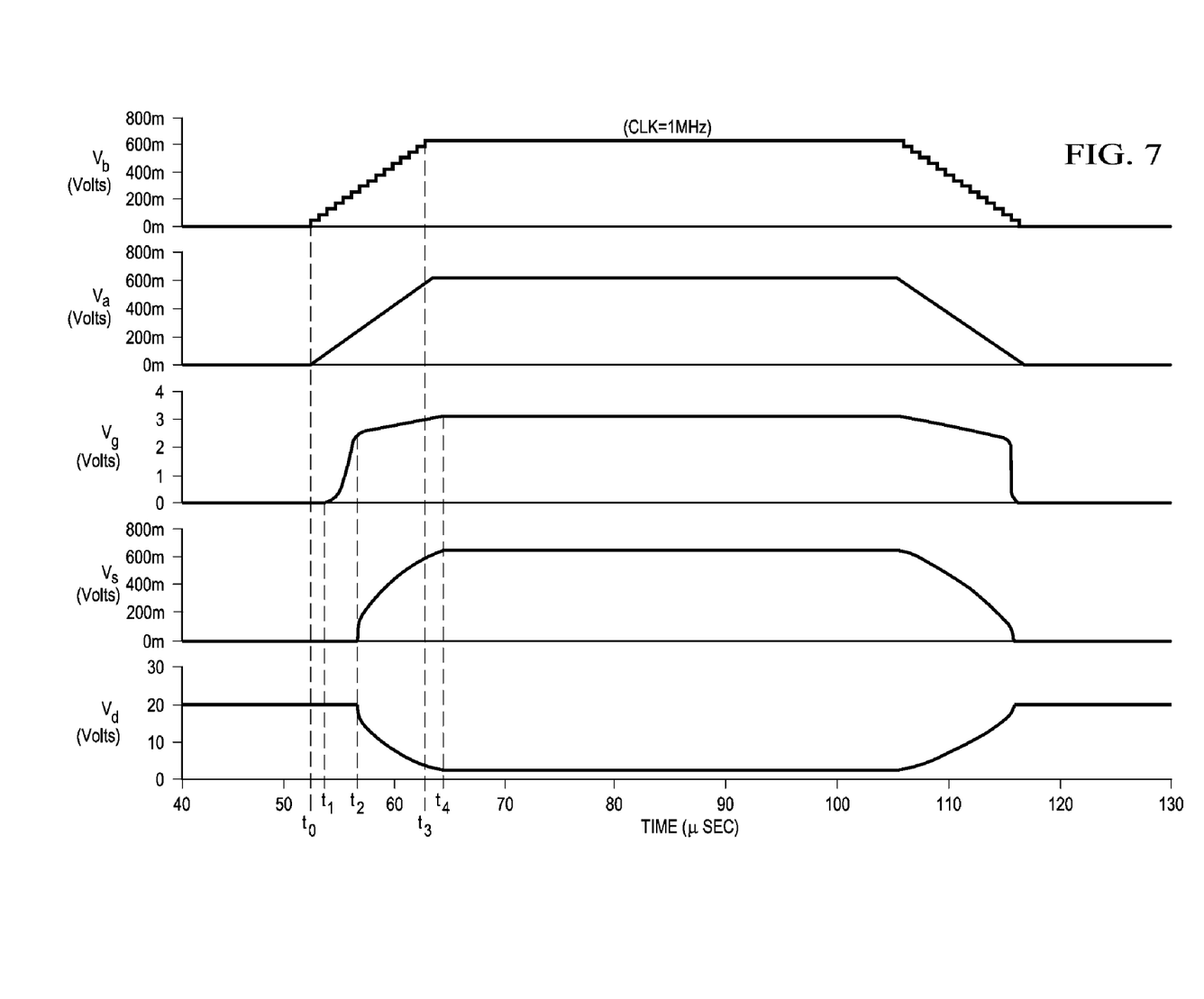
FIG. 7 is a signal waveform diagram showing an example of simulation results obtained when the clock frequency is set at 1 MHz in the LED drive circuit when the circuit in FIG. 4 is employed.
Figure 8:
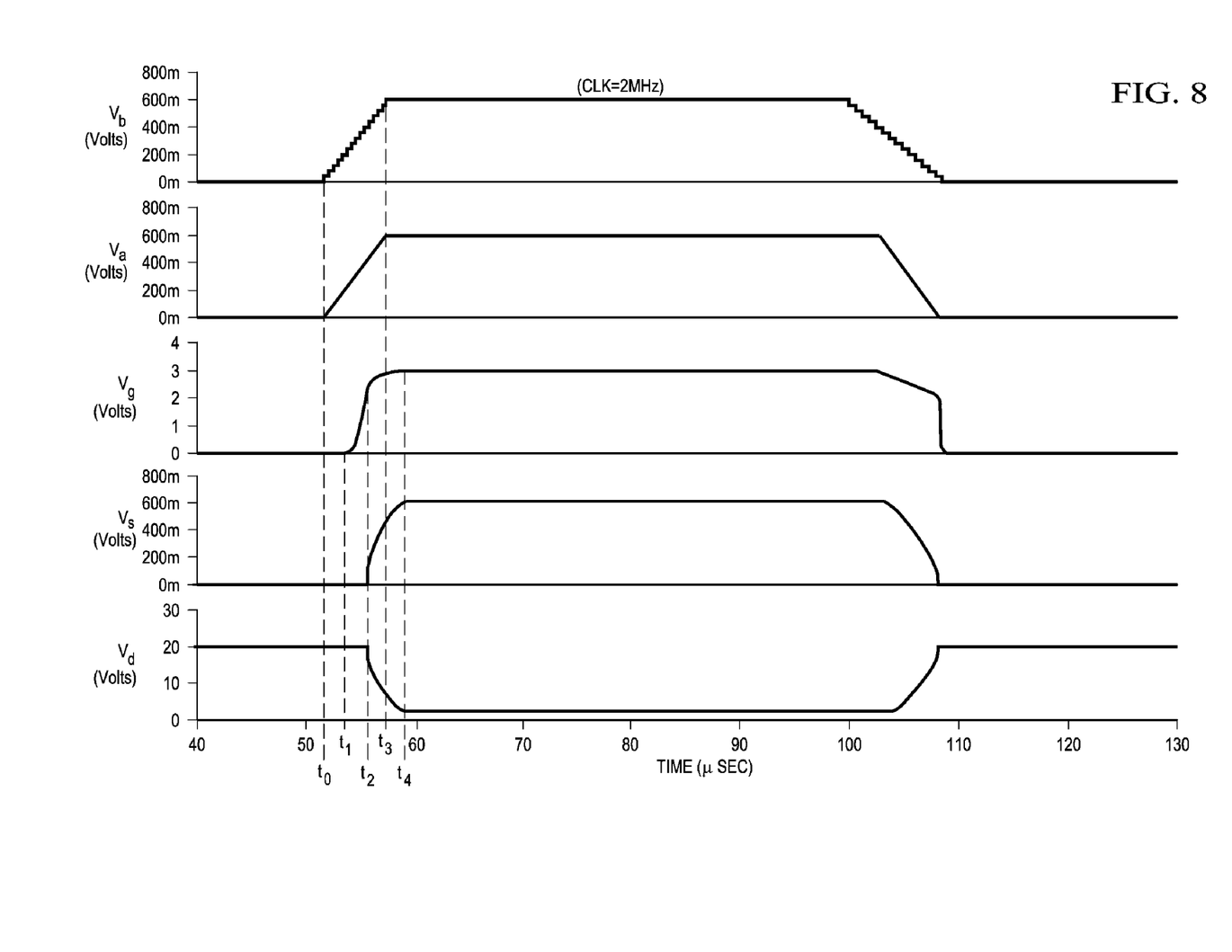
FIG. 8 is a signal waveform diagram showing an example of simulation results obtained when the clock frequency is set at 2 MHz in the LED drive circuit when the circuit in FIG. 4 is employed.

Waveforms obtained at the respective circuits through a simulation conducted using the frequency of clock CLK as a parameter under the same conditions as those described above are shown in FIG. 7 and FIG. 8. FIG. 7 shows a case in which CLK is 1 MHz, and FIG. 8 shows a case in which CLK is 2 MHz. In the figures, $V_d$ is the voltage at the drain terminal of NMOS transistor 14.

As shown in the figures, when the frequency of clock CLK is doubled, the speed counter count value DN incremented/decremented during the ramping up/down for the pulse-lighting is doubled, and the speed voltage ($V_b$) of DAC output signal $V_{DAC}$ ramped up/down is doubled. As a result, the ramping up/down time of voltage $V_S$ at node $N_S$ is approximately 8 μsec when the frequency of clock CLK is set at 1 MHz (FIG. 7), whereas the ramping up/down time of voltage $V_S$ is reduced to approximately 4 μsec when the frequency of clock CLK is set at 2 MHz (FIG. 8). As described above, because voltage $V_S$ at node $N_S$ is proportional to the current value of LED drive current $I_{LED}$, the ramp up/down characteristics of $V_S$ are simultaneously also the ramp up/down characteristics of LED drive current $I_{LED}$.

Here, some delay ($t_0$-$t_1$) is present between output voltage $V_a$ of low-pass filter 28 and output voltage $V_g$ of buffer amplifier 24, and some delay ($t_1$-$t_2$) is also present between output voltage $V_g$ of buffer amplifier 24 and LED drive current $I_{LED}$. These time delays are attributable to the threshold voltage of NMOS transistor 14. For example, the closed loop created by buffer amplifier 24→NMOS transistor 14→resistor 16 (node $N_S$)→buffer amplifier 24 operates during period $t_2$-$t_4$.

Figure 9:
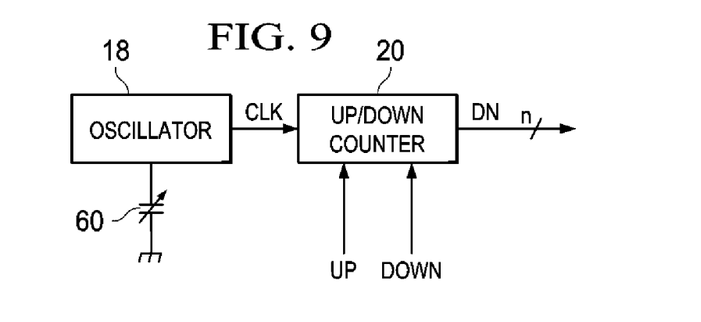
FIG. 9 is a diagram showing a technique for variable-adjustment of the clock frequency in the LED drive circuit.
Figure 10:
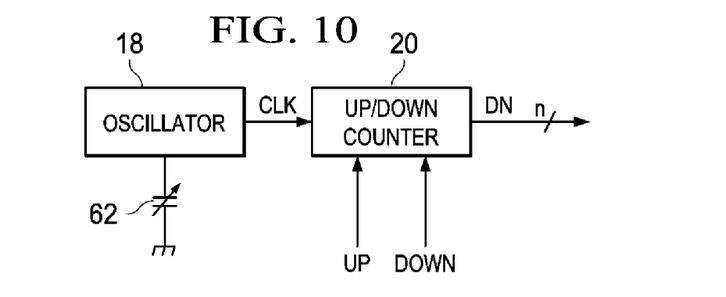
FIG. 10 is a diagram showing a technique for variable-adjustment of the clock frequency in the LED drive circuit.

As described above, the through rate during the ramping up/down of LED drive current $I_{LED}$ can be adjusted by changing the frequency of the oscillated clock CLK output from oscillator 18. As shown in FIG. 9 and FIG. 10, variable condenser 60 or variable resistor 62, for example, may be used to change the frequency of clock CLK. Alternatively, a voltage control oscillator capable of changing its output frequency using an external control voltage may be utilized.

Figure 11:
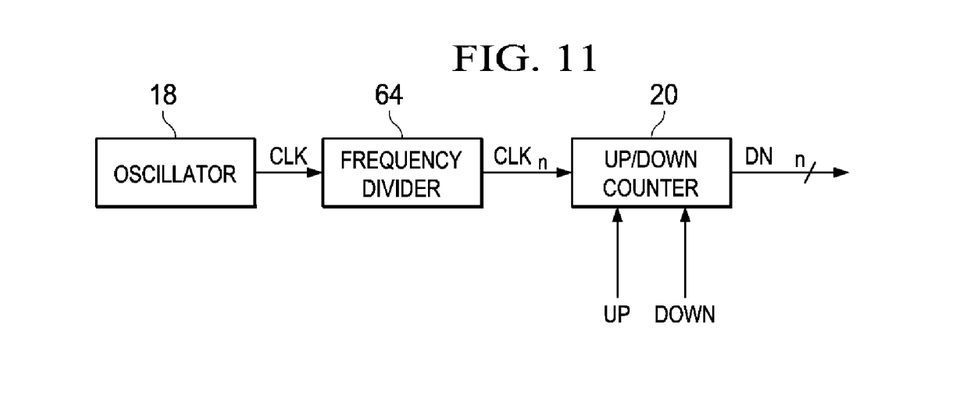
FIG. 11 is a diagram showing a technique for variable-adjustment of the clock frequency in the LED drive circuit.

In addition, in order to adjust the through rate, frequency divider 64 may be connected between oscillator 18 and up/down counter 20 so as to divide the frequency of clock CLK using a desired dividing ratio 1/N (N is an integer equal to or greater than 2) as shown in FIG. 11.

Figure 12:
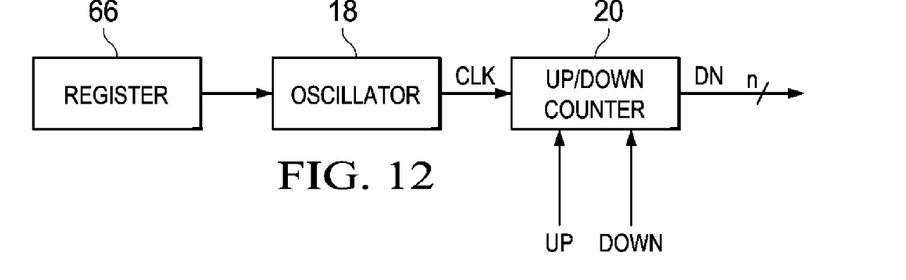
FIG. 12 is a diagram showing a technique for variable-adjustment of the clock frequency in the LED drive circuit.
Figure 13:
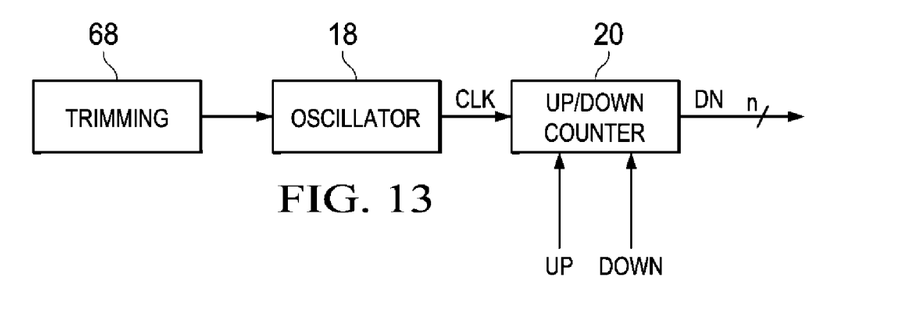
FIG. 13 is a diagram showing a technique for variable-adjustment of the clock frequency in the LED drive circuit.

Alternatively, the method shown in FIG. 12, wherein oscillator 18 is configured to be programmable and register 66 is used to set/input a desired oscillating frequency, is also feasible. Furthermore, as shown in FIG. 13, it is also feasible to supply a trimming control signal from trimming circuit 68 to oscillator 18 in order to adjust/fix the oscillating frequency.

Figure 14:
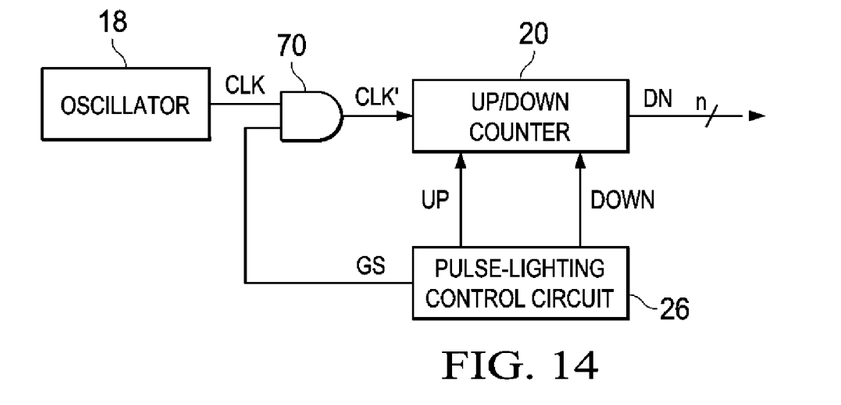
FIG. 14 is a diagram showing a technique for changing the through rate during ramping up/down of the LED drive current in the LED drive circuit.
Figure 15:
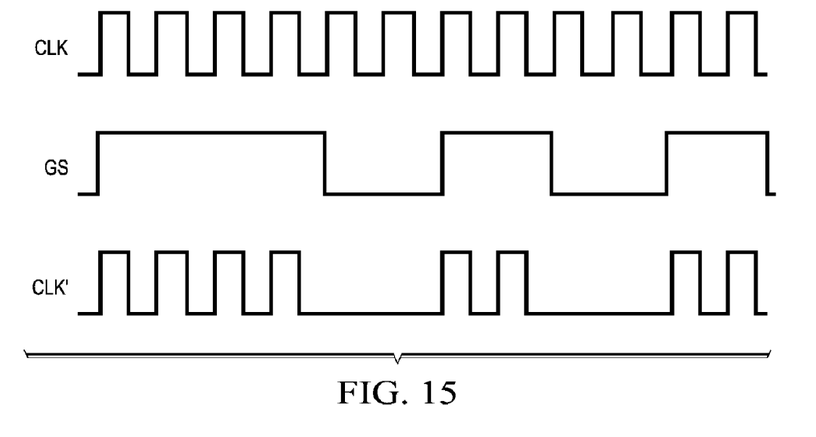
FIG. 15 is a timing chart for explaining the operation of the through rate variable-adjustment circuit shown in FIG. 14.

In addition, as shown in FIG. 14 and FIG. 15, when gate circuit 70 is inserted between oscillator 18 and up/down counter 20, and clock CLK is sent to up/down counter 20 only during a desired gating time to be defined by gate control signal GS, the clock rate can be changed dynamically, and the through rate during the ramping up/down of LED drive current $I_{LED}$ can thus be changed dynamically as desired.

In addition, as described above, the through rate adjustment can also be achieved by changing the resolution (quantum number) of DAC 22. The variable adjustment of the resolution of DAC 22 can be achieved through reference voltage $V_B$ used for the D/A conversion.

Figure 16:
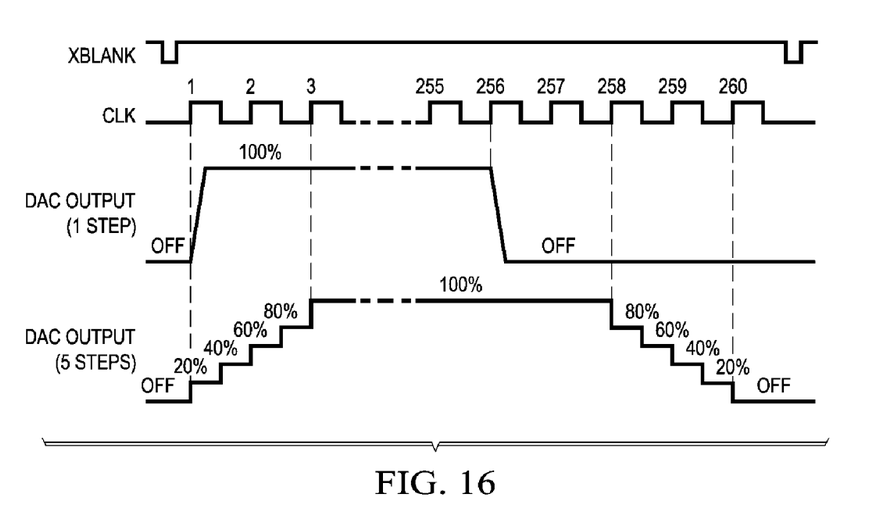
FIG. 16 is a diagram showing the resolution conditions used in a simulation for inspecting the effects of the through rate adjustment operation circuit of FIG. 14.
Figure 17A:
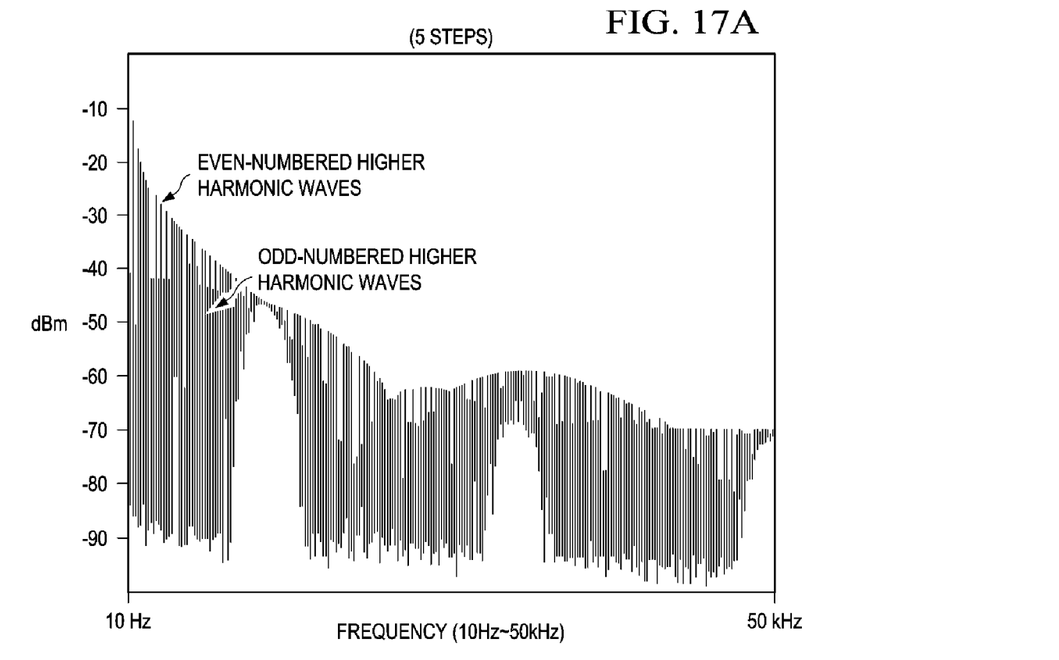
FIG. 17A is a graph showing spectrum characteristics obtained through the simulation in FIG. 16 when 5 steps are involved.
Figure 17B:
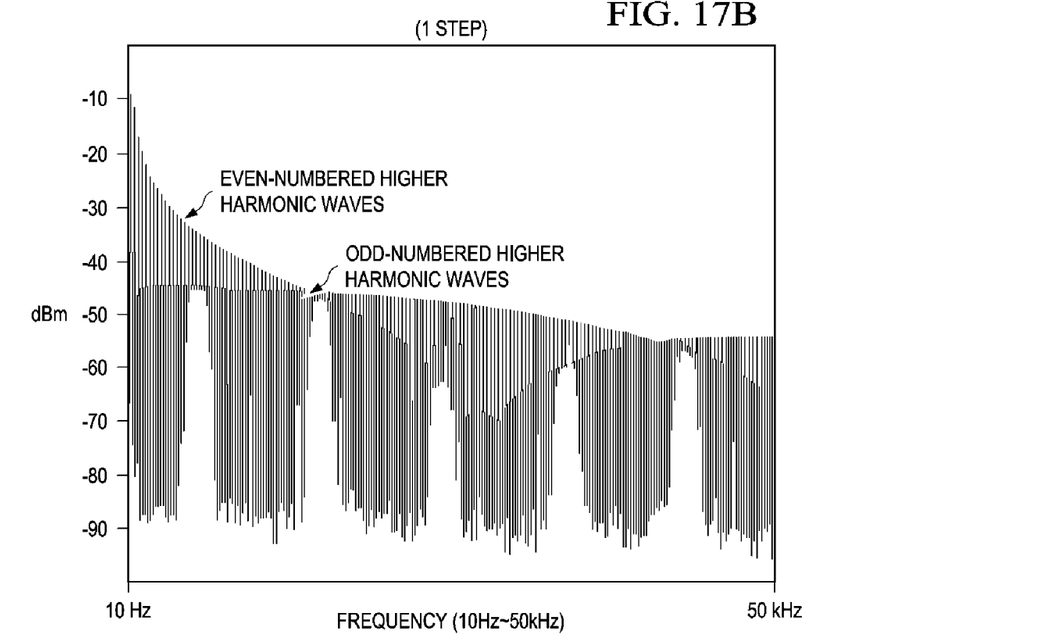
FIG. 17B is a graph showing spectrum characteristics obtained through the simulation in FIG. 16 when 1 step is involved.

An example simulation for inspecting the effect achieved by the LED pulse-lighting through rate adjustment operation in the embodiment under simple resolution conditions is shown in FIG. 16 and FIG. 17. In this simulation, the PWM frequency was set at 125 Hz, and the duty ratio was set at 50%; and 2 resolutions, that is, as shown in FIG. 16, 100% (1 step) and 20% (5 steps), were selected for DAC 22 for comparison. The spectrum characteristics of electromagnetic waves emitted through the PWM switching operation obtained under the resolution of 20% (5 steps) are shown in FIG. 17A, and a case in which the resolution was 100% (1 step) is shown in FIG. 17B. The results of this simulation indicate that the higher the resolution is (the greater the number of steps), the lower the higher harmonic noise.

According to the present invention, because the through rate during the pulse-lighting can be adjusted easily even if the number of LEDs to be driven by 1 LED drive circuit, or the system, is changed, application to a wide range of systems is possible, and component and development costs can also be reduced during product development.

Here, in the case of the LED drive circuit shown in FIG. 1, LEDs 10(1)-10(m), which are used to configure one row of the LED backlight, are driven in a block. For this, oscillator 18, up/down counter 20, DAC 22, pulse-lighting control circuit 26, low-pass filter 28, and switch control circuit 36 can be shared to drive the LEDs of the other rows, so they can be formed into 1-chip integrated circuit per 1 LED backlight.

The LED drive circuit of the present invention is not restricted to the LED backlight of the embodiment, and it can be applied to other LED application fields, such as LED-based illumination, LED displays, and so forth.

Although the present invention has been described with reference to a specific embodiment, it is not limited to this embodiment and no doubt alternatives will occur to the skilled person that lie within the scope of the invention as claimed.

The invention claimed is:

1. An apparatus comprising:
   a DC power supply;
   a light emitting diode (LED) coupled to the DC power supply; and
   an LED drive circuit having:
   an oscillator that generates a clock signal;
   an up/down counter that is coupled to the oscillator so as to receive the clock signal and that has a count value, wherein the up/down counter increments the count value during ramp down of the LED drive circuit, and wherein the up/down counter decrements the count value during ramp up of the LED drive circuit;
   a digital-to-analog converter (DAC) is coupled to the up/down counter so as to receive the an outputted count value; and
   a transistor that is coupled to the DC power supply in parallel with the LED and is operated according to an output signal from the DAC.

2. The apparatus of claim 1, wherein a buffer amplifier is coupled between the output terminal of the DAC and the control terminal of the transistor.

3. The apparatus of claim 2, wherein a resistor is coupled to the DC power supply in series with the LED in order to generate a monitor voltage proportional to the LED drive current, and wherein the buffer amplifier receives the monitor voltage input in the form of a feedback signal and outputs a signal for controlling the transistor such that the monitor voltage becomes equal to the voltage of an output signal from the DAC.

4. The apparatus of claim 3, wherein the buffer amplifier is configured with an operational amplifier that is connected to the output terminal of the DAC through its non-inverting input terminal, to the resistor through its inverting input terminal, and to the control terminal of the transistor through its output terminal.

5. The apparatus of claim 4, wherein LED drive circuit further comprises:
   a first switch that is coupled between the output terminal and the inverting input terminal of the operational amplifier and
   a first switch control circuit that holds the first switch in the off state while the LED drive current is being applied and switches the first switch from the off state to the on state when the ramping down of the LED drive current has been completed.

6. The apparatus of claim 5, wherein the first switch control circuit has a first decoder that decodes a digital count value output from the up/down counter in order to switch the state of the first switch according to the count value.

7. The apparatus of claim 1, wherein LED drive circuit further comprises:
   a second switch that is coupled between the output terminal of the DAC and the control terminal of the transistor;
   a peak value control signal generator circuit that outputs a peak value control signal;
   a third switch that is coupled between the output terminal of the peak value control signal generator circuit and an output-side node of the second switch; and
   a second switch control circuit having a second decoder that decodes a digital count value output from the up/down counter, wherein the second switch control circuit holds the second switch in the on state while holding the third switch in the off state when the count value is lower than a preset value and holds the second switch in the off state while holding the third switch in the on state when the count value is higher than the preset value.

8. The apparatus of claim 1, wherein LED drive circuit further comprises a low-pass filter that smoothens the voltage waveform of the output signal from the DAC.

9. The apparatus of claim 1, wherein LED drive circuit further comprises a through rate adjustment circuit that variably adjusts the through rate at the time of the ramping up and down of the LED drive current.

10. The apparatus of claim 9, wherein the through rate adjustment circuit has a means to variably adjust the oscillating frequency of the oscillator.

11. The apparatus of claim 9, wherein the through rate adjustment circuit has a divider that divides the clock generated by the oscillator using a desired frequency dividing ratio.

12. The apparatus of claim 9, wherein the through rate adjustment circuit has a means to variably adjust the resolution of the DAC.

13. The apparatus of claims 1, wherein the up/down counter holds a preset maximum count value once the maximum value is reached until the next count-down operation begins, or holds a preset minimum count value once the count value has reached the minimum value until the next count-up operation begins.

14. The apparatus of claim 1, wherein LED drive circuit further comprises a gate circuit that receives clock input from the oscillator and allows the clock to be applied to the DAC side only during a desired gating time.

15. The apparatus of claim 1, wherein the time between the beginning of the count-up operation and the end of the count-down operation of the up/down counter is varied.

16. The apparatus of claim 15, wherein the LEDs are pulse-lighted at a constant cycle by means of a pulse width modulation method.

17. An apparatus comprising:
 an oscillator;
 a first control circuit that indicates a ramp up mode and a ramp down mode;
 an up/down counter that is coupled to the oscillator and the control circuit and that includes a count value, wherein the up/down counter decrements the count value during the ramp up mode, and wherein the up/down counter increments the count value during the ramp down mode;
 a DAC that is coupled to the up/down counter;
 a transistor having a first passive electrode, a second passive electrode, and a control electrode, wherein the DAC controls the voltage applied to the control electrode of the transistor, and wherein the first passive electrode of the transistor is configured to be coupled to an LED;
 a switch that is coupled between the control electrode of the transistor and the second passive electrode of the transistor; and
 a second control circuit that is coupled to the up/down counter and the switch, wherein the second control circuit controls the switch.

18. The apparatus of claim 17, wherein the apparatus further comprises:
 a filter that is coupled to the DAC; and
 an amplifier that is coupled to the filter, the control electrode of the transistor, and the second passive electrode of the transistor.

19. The apparatus of claim 18, wherein the apparatus further comprises a resistor that is coupled to the second passive electrode of the transistor.

20. The apparatus of claim 19, wherein the transistor further comprises a first transistor, and wherein the apparatus further comprises:
 a second transistor having a first passive electrode, a second passive electrode, and a control electrode, wherein the first passive electrode of the second transistor is coupled to the DAC, and wherein the second passive electrode of the second transistor is coupled to the filter;
 a third transistor having a first passive electrode, a second passive electrode, and a control electrode, wherein the first passive electrode of the third transistor is coupled to the filter;
 a third control circuit that is coupled to the second passive electrode of the third transistor, wherein the third control circuit generates a peak value; and
 a logic circuit that is coupled to the up/down counter and the control electrodes of the second and third transistors.

21. The apparatus of claim 20, wherein the first, second, and third transistors further comprise first, second, and third NMOS transistors, respectively.

* * * * *